Patented July 14, 1936

2,047,187

UNITED STATES PATENT OFFICE 2,047,187

FIRE RESISTANT POROUS INSULATING MATERIAL

Hubert L. Becher, Trenton, N. J., assignor to The Agasote Millboard Company, Ewing Township, N. J., a corporation of New York No Drawing. Application November 19, 1934, Serial No. 753,649

1 Claim. (Cl. 106—18)

My invention relates to an insulating material consisting of exfoliated vermiculite and gelatinized (regenerated) cellulose. I produce this material by adding a solution of viscose to exfoliated vermiculite and stirring the two substances until a thorough mixture has been obtained. The resulting material is then shaped in any desired manner, for instance, in a mold, being subjected during the shaping operation to such a degree of pressure as will result in a product having the desired density.

Preferably I "clean" the viscose solution, that is, treat it with alum (aluminum sulfate) or some other weak acid substance, such as an organic monocarboxylic acid, in order to neutralize the free alkali present in the ordinary viscose solution, and decompose the colored and ill smelling by-products formed during the viscose reaction. The shaped product will quickly dry and will consist of a mixture of exfoliated vermiculite and gelatinized (regenerated) cellulose. This product is highly fire resistant and, being porous, is suitable for use in the coating of steam pipes or cooling pipes and in the insulation and sound-proofing of houses.

The most practicable proportions are about 50% by weight of viscose solution and 50% by weight of exfoliated vermiculite, thus resulting in a product containing approximately 94% of the vermiculite and 6% of gelatinized cellulose.

The use of a solution of cellulose which, when dried, would result in the production of gelatinized cellulose, for instance, a solution of cellulose in cuprammonium compounds, would be the equivalent of the viscose solution.

The agglomerate, after shaping, is preferably dried at a temperature of somewhat over 212° F., as this will cause a more rapid decomposition of the viscose to form gelatinized cellulose.

When I refer in my claim to drying, I include drying in the atmosphere, although for commercial purposes this method would be entirely too slow.

I claim:

A porous agglomerate comprising in the neighborhood of 94% by weight of exfoliated vermiculite, and in the neighborhood of 6% by weight of gelatinized cellulose.

HUBERT L. BECHER.